Sept. 16, 1924.  
C. E. GLASSER  
1,508,688

CONTROL SYSTEM FOR AUTOMATIC ARC WELDING APPARATUS

Original Filed Sept. 12, 1921   2 Sheets-Sheet 1

Inventor:
Charles E. Glasser,
by Albert G. Davis
His Attorney.

Sept. 16, 1924.  1,508,688
C. E. GLASSER
CONTROL SYSTEM FOR AUTOMATIC ARC WELDING APPARATUS
Original Filed Sept. 12, 1921   2 Sheets-Sheet 2
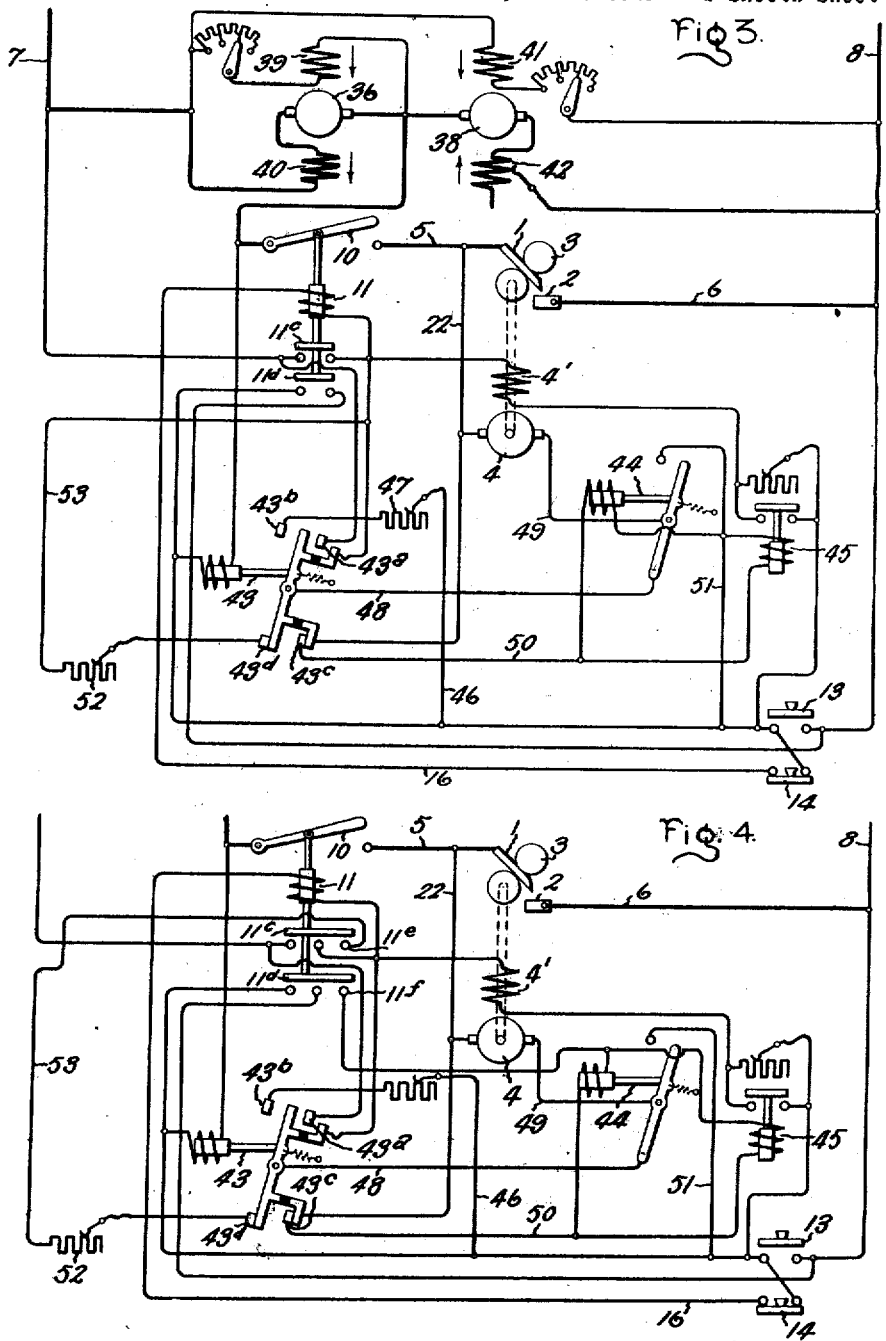
Inventor:
Charles E Glasser,
by Albert G. Davis
His Attorney.

Patented Sept. 16, 1924.

1,508,688

UNITED STATES PATENT OFFICE.

CHARLES E. GLASSER, OF SCHENECTADY, NEW YORK, ASSIGNOR TO GENERAL ELECTRIC COMPANY, A CORPORATION OF NEW YORK.

CONTROL SYSTEM FOR AUTOMATIC ARC-WELDING APPARATUS.

Application filed September 12, 1921. Serial No. 500,007. Renewed April 9, 1924.

*To all whom it may concern:*

Be it known that I, CHARLES E. GLASSER, a citizen of the United States, residing at Schenectady, in the county of Schenectady, State of New York, have invented certain new and useful Improvements in Control Systems for Automatic Arc-Welding Apparatus, of which the following is a specification.

My invention relates to electric arc welding systems and particularly to control systems for automatic arc welding apparatus of the type wherein a fusible metallic electrode is arranged to be continuously fed to the work at a rate varying with the arc voltage so that the arc is maintained at substantially constant length.

An object of my invention is to provide a control system which shall insure the protection of the low voltage relays and control apparatus, designed to operate at normal arc voltage, against injury from the relatively high open circuit voltage of the welding circuit, thereby preventing direct injury to the control apparatus and also preventing such abnormal operation of the control apparatus as might occur upon the application of voltages approximating the open circuit voltage.

My invention will be better understood from the following description taken in connection with the accompanying drawings, and its scope will be pointed out in the appended claims.

In the accompanying drawings, Figs. 1, 2, 3 and 4 are diagrammatic representations of automatic arc welding systems embodying my invention.

Figure 1:
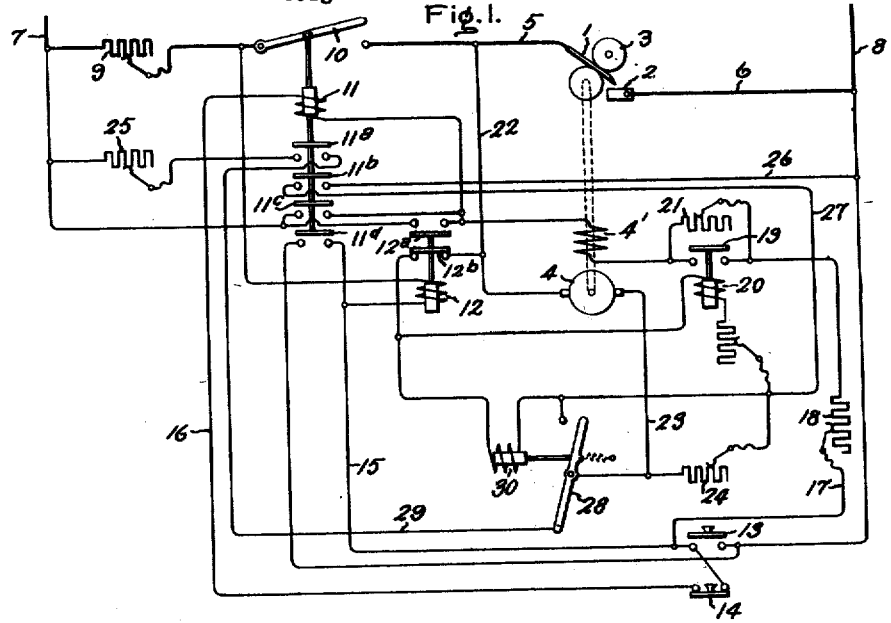

Referring to Fig. 1, the metallic electrode 1 is fed toward the work 2 by means of the electrode feed rolls 3 driven by the electrode feed motor 4 which is connected as hereinafter described so that it will operate to strike the arc as well as maintain the arc at constant length after it has been started. The welding circuit 5, 6 is fed from the constant voltage supply mains 7 and 8, in the system shown in Fig. 1, through an adjustable resistor 9 which causes the voltage in the welding circuit to vary inversely with the current as is well known in the art. An electromagnetically operated switch 10 is arranged to open and close the welding circuit, the operating coil for the switch 10 being shown at 11. A protective relay having an operating coil 12 is arranged to control contacts 12$^a$ and 12$^b$ for a purpose hereinafter described. A pair of push buttons comprising a normally open starting push button 13 and a normally closed stopping button 14 are provided for setting the apparatus into operation and stopping it whenever desired. Upon closing the push button 13, a circuit is completed from the line 8, through the push button 13 and lead 15 to the coil 12 of the protective relay, through the resistor 9 to the line 7. When the switch 10 is open there is no current flowing in the welding circuit and therefore no voltage drop in the resistor 9; consequently the full voltage of the mains 7 and 8 is impressed upon the operating coil 12 of the protective relay which closes contact 12$^a$ and opens contact 12$^b$. Closing of contact 12$^a$ completes a circuit from the line 8, through push buttons 13 and 14 and lead 16, through the operating coil 11 of the switch 10, through contact 12$^a$ to the line 7. Switch 10 is therefore closed in response to the closing of the protective relay 12. In closing, switch 10 closes a plurality of interlocked contacts 11$^a$, 11$^b$, 11$^c$, and 11$^d$. Contact 11$^d$ short circuits the starting push button 13 so that this push button may be released without deenergizing the protective relay 12 and the operating coil 11 of the switch 10. The closing of contact 12$^a$ of the protective relay also completes the circuit of the field winding 4' of the electrode feed motor 4 the circuit of which leads from line 8 through push button 13, or contact 11$^d$, through the lead 17, adjustable resistance 18, contact 19 of the vibratory relay 20, field winding 4' and contact 12$^a$ to the line 7. The contact 11$^c$ short circuits contact 12$^a$ maintaining the field circuit just traced closed independently of the protective relay. The contact 19 is in its closed position. short circuiting the resistance 21 at this phase of operation for the reason that the contact 12$^b$ of the protective relay is open thus deenergizing the winding of the relay 20. Voltage is now impressed upon the armature of the feed motor 4 in a direction to cause its operation to feed the electrode toward the work 2 by reason of the following connections: One terminal of the armature of the feed motor 4 is connected by the lead 22 to the side of the welding circuit 5 connected to the electrode 1. The other terminal of the armature of the feed motor 4 is connected by the lead 22 to a point between the adjustable resistor 24 and the adjustable resistor 25 which resistors are connected across the constant potential mains 7 and 8 through the following circuit: main 8, lead 26, contact 11<sup>b</sup>, lead 27, resistor 24, the lower pole of double throw switch 28, lead 29, contact 11<sup>a</sup>, and resistor 25 to main 7. A Wheatstone bridge effect is produced, the two arms of one side of the bridge being represented respectively by the resistor 9 and the welding arc between electrodes 1 and 2, and the two arms of the other side of the bridge by resistors 25 and 24. The welding circuit being broken at electrodes 1 and 2, this arm of the bridge is open and current, therefore, flows through the armature of the feed motor 4 from main 8 through resistor 24, the feed motor armature, and the resistor 9 to the main 7. The feed motor, therefore, operates to feed the electrode 1 into engagement with the work 2. The rate of feeding is controlled by the adjustment of resistors 24 and 25 as is well known in the art. During this phase of operation, the field winding 4' of the motor is energized to its full strength and the motor, therefore, operates to feed the electrode slowly toward the work. Upon engagement of the electrodes the welding circuit is short circuited and the flow of the short circuited current produces a drop in resistor 9 substantially equal to the voltage of the constant voltage mains 7 and 8. Since the voltage drop in the resistors 24 and 25 is substantially constant, current now flows through the feed motor armature in the other direction, namely, from main 8 to the electrode 1, through the lead 22, armature 4, lead 23, switch 28, lead 29, contact 11<sup>a</sup> and resistor 25 to the main 7. The feed motor now operates in the reverse direction to withdraw the electrode 1 from the electrode 2 and strike the arc. As soon as the arc is drawn, the voltage across the arc increases and at a predetermined voltage the current through the feed motor 4 would reverse and operate the motor in a direction to feed the electrode 1 toward the work to maintain the welding arc. I adjust the coil of contactor 28 to throw over this contactor just before normal arc voltage is reached. When the electrode 1 engaged the work 2, as above described, the coil 12 of the protective relay was short circuited so that this relay dropped to its lower position. The opening of the contact 12<sup>a</sup> of the protective relay produced no circuit change, however, for the reason that contact 11<sup>c</sup> maintains a shunt circuit around the break controlled by contact 12<sup>a</sup>. The closing of contact 12<sup>b</sup>, however, connects the coil 20 of the vibratory regulator for the field circuit of the feed motor and the coil 30 of the double throw switch 28 across the arc. The circuit for coil 30 leads from the welding electrode 1 through contact 12<sup>b</sup>, coil 30, lead 27, contact 11<sup>b</sup>, and lead 26 to main 8 which is connected to the work 2. The circuit for coil 20 leads from welding electrode 1 through lead 22, contact 12<sup>b</sup>, coil 20, lead 27, and thence to the work 2 by the circuit just traced. Coil 30 is designed to operate upon the occurrence of substantially normal voltage at the welding arc, for example, this coil may be set to operate at 10 or 12 volts where the welding voltage is to cover a range of from 12 to 20 volts. The energization of coil 30 throws over the switch 28, the lower pole of which breaks the circuit from lead 29 through resistor 25, and the upper pole of which short circuits the resistor 24, thus connecting the electrode feed motor armature 4 directly across the welding circuit with no resistance interposed in the circuit. The coil 12 of the protective relay is designed so that the protective relay remains in its lower position during normal arc voltage. Whenever the welding circuit is open at the electrodes, while the switch 10 is closed, the full voltage of the constant voltage mains 7 and 8 appears at these electrodes and the protective relay 12 is provided to prevent the application of this abnormal voltage to the coils of relays 20 and 30 and the armature of the feed motor 4. If a normal welding voltage of from 12 to 20 volts is used the relay 12 will be set to operate at a voltage somewhat higher than the maximum welding voltage so that this relay will operate whenever the arc is broken. This insures that the protective relay will operate to prevent damage to the control apparatus, which is designed for comparatively delicate operation at the relatively low normal arc voltage. During normal welding any tendency of the welding arc to lengthen increases the voltage on the armature of the feed motor 4 and tends to speed up the feed motor to feed the electrode 1 more rapidly so as to compensate for its consumption by the welding current thereby maintaining the arc length substantially constant. The sensitiveness of the feeding operation is also accentuated by the vibratory regulator 20 which vibrates to control the effective value of the resistance 21 to vary the energization of the field winding 4' of the electrode feed motor. In order to stop the operation of the system at any time it is merely necessary to open push button 14 which deenergizes winding 11 of the switch 10 thus opening the welding circuit. The opening of switch 10 simultaneously opens contact 11<sup>d</sup> opening the circuit of the coil of the protective relay 12. The opening of switch 10 also opens contacts 11<sup>a</sup> and 11<sup>c</sup> interrupting the circuits through arms of the bridge comprising resistances 24 and 25 and also opens the contact 11<sup>c</sup> to open the field circuit of the electrode feed motor. All of the circuits of the control apparatus, are, therefore, now dead. The opening of the bridge circuit is important for the reason that if this were not done and the electrode 1 were moved manually into engagement with the work 2, or the circuit of the welding arc accidentally completed in some other manner, a voltage would be impressed upon the electrode feed motor in a direction to feed the electrode through the feed rolls away from the work. The current would flow through this back circuit as follows: from main 8 through the welding circuit 6—5. lead 22, armature of the feed motor 4, lead 23, lower pole of switch 28, lead 29 and through the resistor 25 to the main 7. According to my arrangement of circuits all such back circuits which might tend to cause an undesirable operation are prevented.

The regulation for the electrode feed motor is described and claimed in the copending application of Paul O. Noble, Serial No. 323,170, filed Sept. 11, 1919, assigned to the assignee of this application, and is also described in British Patent No. 139,919, to the British Thomson-Houston Co., Ltd. The Wheatstone bridge arrangement for controlling the operation of the feed motor is disclosed in the copending application of Max A. Whiting, Serial No. 277,309, filed February 15, 1919, and also in British Patent No. 145,330, to British Thomson-Houston Company, Ltd.

Figure 2:
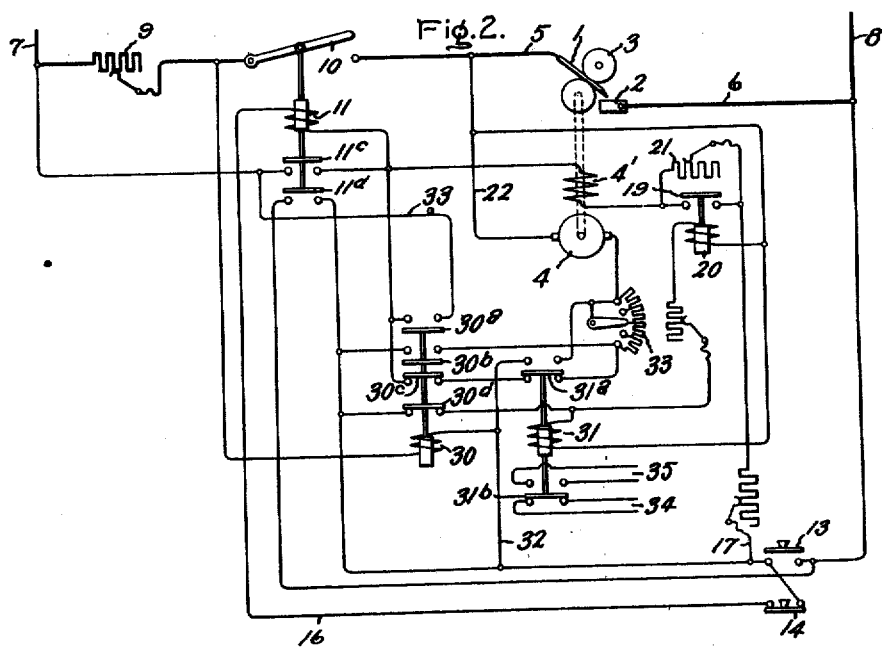

Fig. 2 shows a modified form of arc welding system embodying my invention. In the system of Fig. 2 the Wheatstone bridge arrangement of Fig. 1 is not used and the circuits for operating the electrode feed motor in the respective directions for striking the arc and feeding the electrode to maintain normal voltage are made by connecting one terminal of the motor to either one side or the other of the constant voltage mains. In this figure the constant voltage mains and welding circuit as well as the electrode feed rolls and push buttons are arranged as in Fig. 1. The vibratory relay 20 for controlling the strength of the motor field winding 4' during normal operation also operates as in the system shown in Fig. 1. The protective relay is shown at 30 and this relay co-operates with the relay 31 for controlling the direction of operation of the motor. The circuit arrangement of Fig. 2 may be most easily explained by describing the manner of setting the system into operation which is as follows: Upon completing the circuit of push button 13 a circuit is completed from main 8 through push button 13, lead 32, coil 30 of the protective relay and resistor 9 to the main 7. The protective relay moves to its upper position closing the contacts 30$^a$ and 30$^b$, and opening the contacts 30$^c$ and 30$^d$. The closing of contact 30$^a$ energizes the coil 11 to close the switch 10, through the following circuit: main 8, push buttons 13 and 14, coil 11, contact 30$^a$ and lead 33 to main 7. The closing of the contact 30$^a$ also completes the circuit of the field winding 4' of the electrode feed motor from the main 8 through push button 13 and lead 17 as in the arrangement shown in Fig. 1. The closing of switch 10 closes contacts 11$^c$ and 11$^d$. Contact 11$^d$ short circuits push button 13 as in Fig. 1. Contact 11$^c$ completes the circuit for winding 11 independently of the contact 30$^a$ just as the contact 11$^c$ of Fig. 1 completed a holding circuit for winding 11 independently of contact 12$^a$. Contact 30$^d$ being open, no voltage is applied to the windings 20 and 31. The full voltage of the constant voltage mains 7 and 8 is now applied to the welding electrodes. The circuit for operating the electrode feed motor 4 in a direction to feed the electrode 1 into engagement with the work, runs from main 8 through contact 11$^d$, contact 30$^b$ adjustable resistor 33, feed motor armature, through the lead 22 and switch 10, resistor 9 to the main 7. The resistor 33 is provided to limit the current through the feed motor armature during this phase of the operation to give the desired speed of the feed motor. Upon engagement of the welding electrodes the protective relay 30 becomes deenergized opening contacts 30$^a$ and 30$^b$ and closing contacts 30$^c$ and 30$^d$. The opening of contact 30$^a$ has no effect at this time since this contact is by-passed by contact 11$^c$. Current now flows through the electrode feed motor armature in the reverse direction to strike the arc. This circuit is from main 8 through the welding electrodes, lead 22, armature 4, resistor 33, contact 31$^a$ of relay 31, contact 30$^c$ and contact 11$^c$ to the main 7. Upon the attainment of normal welding voltage at the welding electrodes, relay 31, which is now connected directly across the arc through the contact 30$^d$ moves to its upper position closing contact 31$^a$ in its upper position connecting the armature of the feed motor 4 directly across the arc independently of the resistor 33, through a circuit leading from main 8, contact 11$^d$, lead 32, contact 31$^a$, and the armature of the feed motor 4 and lead 22 to the electrode 1. Current now flows through the armature of the feed motor in the original direction to operate the same in a direction to feed the electrode 1 toward the work to maintain the welding arc. If the arc should go out at any time protective relay 30 will move to its upper position closing contact 30$^b$ and opening contact 30$^d$ which disconnects windings 20 and 31 from circuit. The deenergization of winding 31 will move contact 31$^a$ to its lower position interrupting the circuit just traced for the feed motor armature. The closing of contact 30$^b$ completes the circuit of the feed motor armature through resistor 33, according to the circuit heretofore traced to operate the feed motor in a direction to reestablish the arc. Relay 31 is shown in Fig. 2 as provided with an additional contact 31ᵇ. This contact may be arranged to control the traversing motor customarily employed in completely automatic arc welding machines for traversing the work with respect to the welding head or the welding head with respect to the work. The relay in its lower position which corresponds to an open circuit or short circuited condition of the arc may be arranged to close a braking circuit 34 for the traversing motor. Upon the establishment of normal welding voltage the contact 30ᵇ moves to its upper position to establish the operating circuit 35 for the traversing motor.

Fig. 3 shows a further modification of my invention and in this figure the welding circuit 5—6 is represented as supplied from constant voltage mains 7 and 8 through a balancer set comprising a motor 36 and generator 38 connected and arranged in accordance with the patent to Noble No. 1,310,131, patented July 15, 1919. The motor is provided with cumulative shunt and series field windings 39 and 40 and the generator is provided with differential shunt and series field windings 41 and 42. This balancer set operates to vary the welding voltage substantially inversely with the welding current to produce a regulating effect corresponding to the regulating effect of the resistor 9 of the modifications shown in Figs. 1 and 2. It will be understood, however, that my invention is not limited to any particular means for supplying the welding and control circuits, it being merely essential that there be a substantially constant voltage circuit for certain of the control circuits as well as a welding circuit having voltage characteristics suitable for welding. If desired these circuits may be obtained from a single machine such as is shown, for example, in the patent to Bergman No. 1,340,004, patented May 11, 1920.

In the arrangement shown in Fig. 3 the protective relay is shown at 43 and the cooperating relay for controlling the direction of operation of the feed motor at 44. The relay 45 is a vibratory relay for the field circuit of the motor arranged to operate like the relay 20 of Fig. 1. Upon closing the starting push button 13 a circuit is completed through the operating coil of the relay 43 across the terminals of the generator 38. The energization of the operating coil of relay 43 closes contacts 43ᵃ and 43ᵇ and opens contacts 43ᶜ and 43ᵈ. The closing of contacts 43ᵃ completes a circuit for closing the switch 10. This circuit runs from main 8 through push buttons 13 and 14, lead 16, winding 11 and contacts 43ᵃ to main 7. The closing of contacts 43ᵃ also energizes the field winding 4' of the electrode feed motor. The closing of contacts 43ᵇ completes a circuit for the armature of the feed motor 4 from main 8 through push button 13, lead 46, adjustable resistor 47, contacts 43ᵇ, lead 48, lower pole of relay 44, lead 49, motor 4 to line 5. The energization of the winding 11 by the closing of contacts 43ᵃ closes the switch 10 and the contacts 11ᶜ and 11ᵈ. Contact 11ᵈ short circuits push button 13 as in the modifications heretofore described. Contact 11ᶜ completes a holding circuit for winding 11 and a circuit for the field winding 4' of the feed motor independently of the contact 43ᵃ. Current is now applied to the feed motor armature in a direction to feed the electrode 1 toward the work, through the following circuit: main 8, contact 11ᵈ, lead 46, resistor 47, contacts 43ᵇ, lead 48, the lower pole of relay 44, lead 49, the armature of the feed motor 4, line 5, through the switch 10 to the generator armature 38. When the electrode touches the work, relay 43 is deënergized and contacts 43ᶜ and 43ᵈ are closed and contacts 43ᵃ and 43ᵇ opened. The opening of the contacts 43ᵃ produces no circuit change since these contacts are now short circuited by contact 11ᶜ. The opening of contacts 43ᵇ opens the circuit just traced through feed motor armature. The closing of contacts 43ᶜ connects the windings of relay 44 and 45 directly across the electrodes 1 and 2. This circuit may be traced from line 8, to electrode 1, through lead 22, contacts 43ᶜ and lead 50 to one terminal of each of the windings of relays 44 and 45. The other terminals of these windings are connected to the lead 51 from which the circuit is completed through contact 11ᵈ to the main 8 which is connected to the work 2. The closing of contacts 43ᵈ completes a circuit for operating the electrode feed motor in a direction to strike the arc as follows: from the electrode 1, through the lead 22, armature 4, lead 49, lower pole of the double throw contact arm of relay 44, through lead 48 and contacts 43ᵈ, adjustable resistor 52, lead 53 and contact 11ᶜ to the main 7. When the arc voltage rises to normal relay 44 is energized to throw over the contact arm of the relay, opening the circuit for the feed motor just traced through lead 48, and closing a circuit for the feed motor to operate the same in a direction to feed the electrode toward the work to maintain the welding arc. This circuit runs from main 8 through contact 11ᵈ, lead 51, the upper pole of the double throw contact arm of relay 44, lead 49, through the armature of feed motor 4, through line 5, to the electrode 1. The feed motor now operates in accordance with the voltage changes in the arc to maintain the arc at constant length as described in connection with the modifications shown in Figs. 1 and 2. Opening the push button 14 deenergizes winding 11 and restores the system to the open circuit condition. If at any time during welding the arc should become interrupted, relay 43 will operate to close contacts 43ᵃ and 43ᵇ and open contacts 43ᶜ and 43ᵈ, to protect the control system from the high voltage obtaining on open circuit and to establish a circuit through the armature of the feed motor to restrike the arc as heretofore described.

With the arrangement shown in Fig. 3, it is possible under certain abnormal conditions of operation to produce undesirable operations of the mechanism. For example, if it be assumed that while the push button 13 is open and the push button 14 closed, the operator of the machine completes the circuit from electrode 1 to the work 2 by means of a wire brush or other conducting implement used around the machine, a circuit may be completed from the positive main 8 through the work to electrode 1, lead 22, contact 43ᶜ, lead 50, the winding of relay 44, or the winding of relay 45, lead 51, the winding of relay 43, to the negative main. The current in this circuit may operate relay 43. As soon as the relay 43 moves it will open the circuit just traced at contacts 43ᶜ. The relay will then be deenergized and fall back and again complete the circuit. The relay may thus flutter and there is a possibility that it may move so far as to close contacts 43ᵃ to complete the circuit of winding 11 for the contactor 10. A further circuit may be completed in the same manner, as follows: from the positive main as previously traced to the lead 22 through the motor armature 4, the lower pole of relay 44, lead 48, contacts 43ᵈ, resistor 52, lead 53, winding 11, of contactor 10, lead 16, push button 14, winding of relay 43, to the negative main. In order to prevent any possibility of forming these back circuits an additional pair of interlock contacts may be provided on the contactor 10 as indicated in Fig. 4. In this figure lead 53 instead of being connected to the coil 11, field winding 4' and one of the contacts 43ᵃ, is connected to the contact 11ᵉ which is arranged to be engaged by the contact 11ᶜ of the contactor. Similarly the terminals of the windings of relays 44 and 45, which in Fig. 3 are connected to the lead 51, are in Fig. 4, connected directly to contact 11ᶠ which is arranged to be engaged by the contact 11ᵈ of the contactor 10. Since contacts 11ᵉ and 11ᶠ are not energized until engaged by the contacts 11ᶜ and 11ᵈ respectively, the back circuits heretofore referred to cannot be completed. The connections of Fig. 4 are otherwise identical with Fig. 3, and the operation will be obvious from the description of the operation set forth in connection with Fig. 3.

What I claim as new and desire to secure by Letters Patent of the United States, is:—

1. An arc welding system comprising a substantially constant voltage circuit and a welding circuit the voltage of which varies inversely with the current, electrode feeding means and relays responsive to the voltage of the welding circuit for controlling the operation of said feeding means designed for substantially normal welding voltage, characterized by the fact that a protective relay is provided connected and arranged to control the application of voltage to the welding circuit, to maintain said relays out of circuit while the welding circuit voltage is abnormally high and to connect said relays in circuit when the welding circuit voltage is at or below substantially normal value.

2. An arc welding system comprising a supply circuit and a welding circuit the voltage of which varies inversely with the current, electrode feeding means, relays responsive to the voltage of the welding circuit for controlling the operation of said feeding means designed for substantially normal welding voltage, a switch for controlling the welding circuit, and a protective relay connected and arranged to complete the circuit of said switch to close the same and to maintain said relays out of circuit while the welding circuit voltage is abnormally high and to connect said relays in circuit when the welding circuit voltage is at or below substantially normal value.

3. An arc welding system comprising a welding circuit, the voltage of which varies inversely with the current, an electromagnetic switch for closing and opening the welding circuit, an electrode feed motor having a separately excited field winding and an armature circuit adapted to be connected across the welding circuit during normal operation, a protective relay provided with a winding designed to require more than normal welding voltage but less than open circuit voltage to operate the same, circuit controlling means for setting said system into operation arranged to connect the winding of said protective relay across the welding circuit outside of said switch whereby the relay is energized by the open circuit voltage, contact means on said protective relay arranged in the energized position of the relay to complete said motor field circuit and to close said electromagnetic switch and to control the armature circuit of said feed motor to establish a connection for operating said motor to strike the arc, means on said electromagnetic switch, arranged to maintain said electromagnetic switch closed and said field circuit energized independently of said protective relay, and means whereby said protective relay completes the armature circuit of said feed motor across the welding circuit when the protective relay becomes inoperative upon the establishment of normal arc voltage.

4. An arc welding system comprising a pair of constant voltage mains and a welding circuit adapted to supply welding electrodes, an electrode feed motor having one armature terminal connected to one of said electrodes, a pair of resistors connected across said constant voltage mains, a switch for controlling the welding circuit, a switch for controlling the electrode feed motor arranged in one position to connect the other terminal of the armature to a point between said resistors to give a Wheatstone bridge effect for operating said motor to start the arc, said feed motor control switch being arranged in another position to open the circuit between said resistors and connect said armature directly across the arc, and means operated by said welding circuit control switch to control the circuit through said resistors to prevent the flow of current therethrough when the welding circuit control switch is open.

In witness whereof, I have hereunto set my hand this 9th day of September, 1921.

CHARLES E. GLASSER.